United States Patent [19]

Miyamoto

[11] Patent Number: 5,975,509
[45] Date of Patent: Nov. 2, 1999

[54] LIQUID-ENCAPSULATED BUSHING

[75] Inventor: Yasuo Miyamoto, Saitama, Japan

[73] Assignee: Honda Giken Kogyo Kabushiki Kaisha, Tokyo, Japan

[21] Appl. No.: 08/877,731

[22] Filed: Jun. 18, 1997

[30] Foreign Application Priority Data

Jun. 18, 1996 [JP] Japan .................................. 8-156461

[51] Int. Cl.⁶ ....................................................... F16F 5/00
[52] U.S. Cl. ...................................... 267/140.12; 248/636
[58] Field of Search ............................... 267/140, 140.11, 267/140.12, 140.13, 140.14, 140.15, 141, 141.2, 141.3, 141.4, 141.5, 141.6, 141.7, 152, 153, 219; 188/298, 317, 379; 248/636, 562

[56] References Cited

U.S. PATENT DOCUMENTS

| | | | |
|---|---|---|---|
| 5,060,918 | 10/1991 | Kanda | 267/140.12 |
| 5,156,379 | 10/1992 | Tabata | 267/140.12 |
| 5,299,788 | 4/1994 | Kanda | 267/104.12 |
| 5,489,086 | 2/1996 | Kanda | 267/140.12 |

FOREIGN PATENT DOCUMENTS

| | | | |
|---|---|---|---|
| 004320643 | 7/1994 | Germany | 267/140.12 |
| 362224746 | 10/1987 | Japan | 267/140.12 |
| 405248487 | 9/1993 | Japan | 267/140.12 |
| 405321975 | 12/1993 | Japan | 267/140.12 |

*Primary Examiner*—Robert J. Oberleitner
*Assistant Examiner*—Pamela J. Lipka
*Attorney, Agent, or Firm*—Nikaido Marmelstein Murray & Oram LLP

[57] ABSTRACT

First, second, third and fourth liquid chambers including a liquid encapsulated therein are defined by disposition of first and second elastomeric members between outer and inner sleeves. The first and second liquid chambers communicate with each other through a first orifice having a relatively large diameter, and the first and third liquid chambers communicate with the second and fourth liquid chambers through a second orifice having a relatively small diameter. When a small load is input, the first and second liquid chambers are deformed to cause the liquid to pass through the first orifice, so that a relatively small damping force is produced by a resistance due to the liquid passing through the first orifice. When a large load is input, the third and fourth liquid chambers are deformed to cause the liquid to pass through the second orifice, so that a relatively large damping force is produced by a resistance due to the liquid passing through the second orifice. Thus, it is possible to provide a sufficient damping force over a range of a small input load to a large input load.

7 Claims, 7 Drawing Sheets

LIQUID-ENCAPSULATED BUSHING

BACKGROUND OF THE INVENTION

1. Field of the Invention

The present invention relates to a liquid-encapsulated bushing including an elastomeric member disposed between outer and inner sleeves having axes parallel to each other. A plurality of liquid chambers are defined to face the elastomeric member and communicate with one another through orifices, so that the radial relative movement of the outer and inner sleeves is buffered by a resistance due to a liquid passing through the orifices.

2. Description of the Related Art

FIG. 7 shows a conventional liquid-encapsulated bushing. As can be seen from FIG. 7, the conventional liquid-encapsulated bushing B includes an outer sleeve 01 and an inner sleeve 02 having an axis L. First and second liquid chambers $R_1$ and $R_2$ are defined by the outer sleeve 01, a first elastomeric member 04 which interconnects a collar 03 fitted over an outer periphery of the inner sleeve 02 and by a pair of second elastomeric members 06 coupled to the outer sleeve 01 through spacers 05. The first and second liquid chambers $R_1$ and $R_2$ are connected to each other by two orifices O.

When the first elastomeric member 04 is deformed by a load to cause the outer and inner sleeves 01 and 02 to be relatively moved in directions of arrows X and X', the volumes of the first and second liquid chambers $R_1$ and $R_2$ are alternately increased and decreased. The liquid in the first and second liquid chambers $R_1$ and $R_2$ flows between the second and first liquid chambers $R_2$ and $R_1$ through the orifices O. Thus, the load is buffered by a resistance, due to the liquid, generated during the flowing of the liquid. When a further larger load is input to cause the outer and inner sleeves 01 and 02 to be moved largely relative to each other, the first elastomeric member 04 is brought into close contact with one of the second elastomeric members 06, thereby inhibiting the increase in amount of relative movement of the outer and inner sleeves 01 and 02 to exhibit a stopper function.

In the above conventional bushing, when the input load is small and the amount of relative movement of the outer and inner sleeves 01 and 02 is small, the volumes of the first and second liquid chambers $R_1$ and $R_2$ are effectively increased and decreased to provide a sufficient damping force. However, when the first elastomeric member 04 is brought into close contact with one of the second elastomeric members 06 by an increase in input load to establish a state which permits the stopper function to be exhibited, a problem arises in that the volumes of the first and second liquid chambers $R_1$ and $R_2$ are varied very little and thus provide an insufficient damping force.

SUMMARY OF THE INVENTION

Accordingly, it is an object of the present invention to provide a liquid-encapsulated bushing wherein a sufficient damping force can be provided for both a small load to a large load.

To achieve the above object, according to a first aspect and feature of the present invention, there is provided a liquid-encapsulated bushing comprising an elastomeric member disposed between outer and inner sleeves having axes parallel to each other. A plurality of liquid chambers are defined to face the elastomeric member and to communicate with one another through orifices, so that the radial relative movement of the outer and inner sleeves is buffered by a resistance due to a liquid which passes through the orifices. The liquid-encapsulated bushing includes first and second liquid chambers defined on opposite sides of the inner sleeve. The first and second liquid chambers communicate with each other through a first orifice. At least one auxiliary liquid chamber is defined radially outside the first or second liquid chambers. The at least one auxiliary chamber communicates with the first or second liquid chamber. The auxiliary liquid chamber is defined so that the volume thereof is increased or decreased when a large amount of relative movement occurs between the outer and inner sleeves.

In addition, according to a second aspect and feature of the present invention, there is provided a liquid-encapsulated bushing comprising an elastomeric member disposed between outer and inner sleeves having axes parallel to each other. A plurality of liquid chambers are defined to face the elastomeric member and to communicate with one another through orifices, so that the radial relative movement of the outer and inner sleeves is buffered by a resistance due to a liquid which passes through the orifices. The liquid-encapsulated bushing includes first and second liquid chambers defined on opposite sides of the inner sleeve. The first and second liquid chambers communicate with each other through a first orifice. Two individual auxiliary liquid chambers are defined radially outside the first and second liquid chambers and communicate with each other through a second orifice. Each auxiliary liquid chamber is defined so that the volume thereof is increased or decreased when a large amount of relative movement occurs between the outer and inner sleeves.

With the above construction, when an input load is small and the relative movement of the outer and inner sleeves is small, the first and second liquid chambers can be increased and decreased to buffer the load by a resistance due to the liquid passing through the first orifice. When an input load is large and the relative movement of the outer and inner sleeves is large, the volume of the auxiliary liquid chamber (s) can be increased and decreased in addition to the volume of the first and second liquid chambers to effectively buffer the large load by a resistance due to the liquid passing through the second orifice.

According to a third aspect and feature of the present invention, in addition to the first or second feature, the flow path sectional area of the second orifice is set smaller than that of the first orifice.

With the above construction, when the volume of the auxiliary liquid chamber is increased or decreased, a further large resistance can be applied to the liquid passing through the second orifice to provide a sufficient buffering effect.

The above and other objects, features and advantages of the invention will become apparent from the following description of the preferred embodiments taken in conjunction with the accompanying drawings.

DETAILED DESCRIPTION OF THE PREFERRED EMBODIMENTS

The present invention will now be described by way of preferred embodiments with reference to the accompanying drawings.

A first embodiment of the present invention will be described first with reference to FIGS. 1 to 5.

Figure 1:
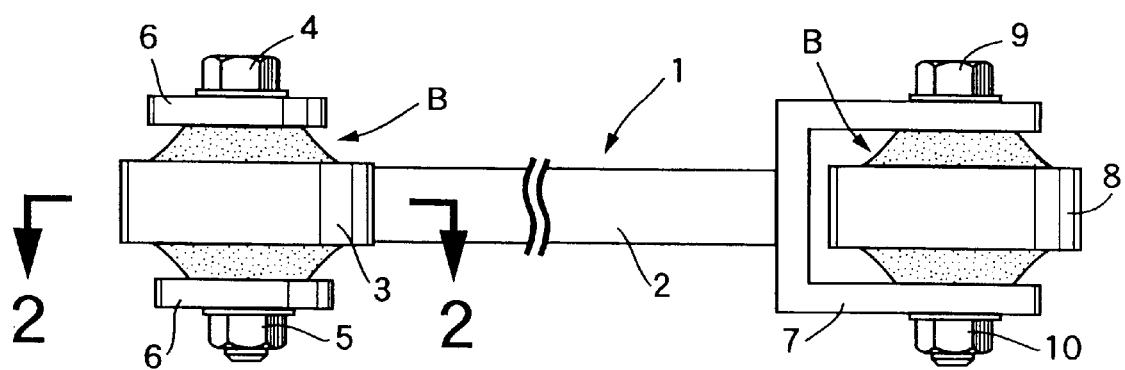
FIG. 1 is a side view of a suspension arm including liquid-encapsulated bushings.

Referring to FIG. 1, there is shown a suspension arm (a leading arm or a trailing arm) 1 of a vehicle. A first liquid-encapsulated bushing B is press-fitted into an annular support portion 3 which is formed at one end of an arm body of the suspension arm 1. The bushing B is fixed between a pair of mounting brackets 6, 6 which are mounted on a vehicle body by a nut 5 and a bolt 4 which is inserted through the bushing B. A U-shaped support portion 7 is formed at the other end of the arm body 2. A second liquid-encapsulated bushing B is press-fitted into an annular support portion 8 which is formed at a tip end of a knuckle arm. The second bushing B is fixed by a nut 10 and bolt 9 which is inserted into the bushing B. Both first and second liquid-encapsulated bushings B have substantially the same structure. Hence, only the structure of the liquid-encapsulated bushing B fixed to the mounting brackets 6, 6 on the vehicle body will be described.

Figure 2:
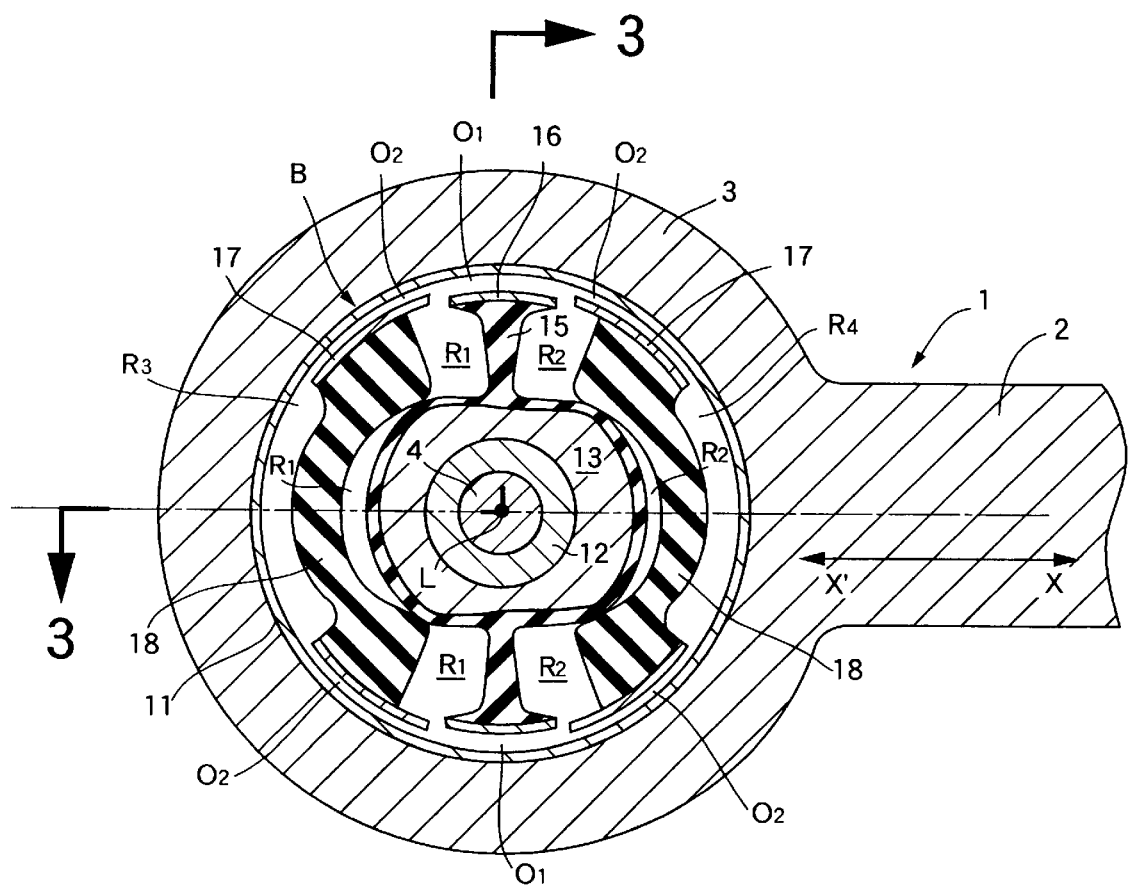
FIG. 2 is an enlarged sectional view taken along a line 2—2 in FIG. 1.
Figure 3:
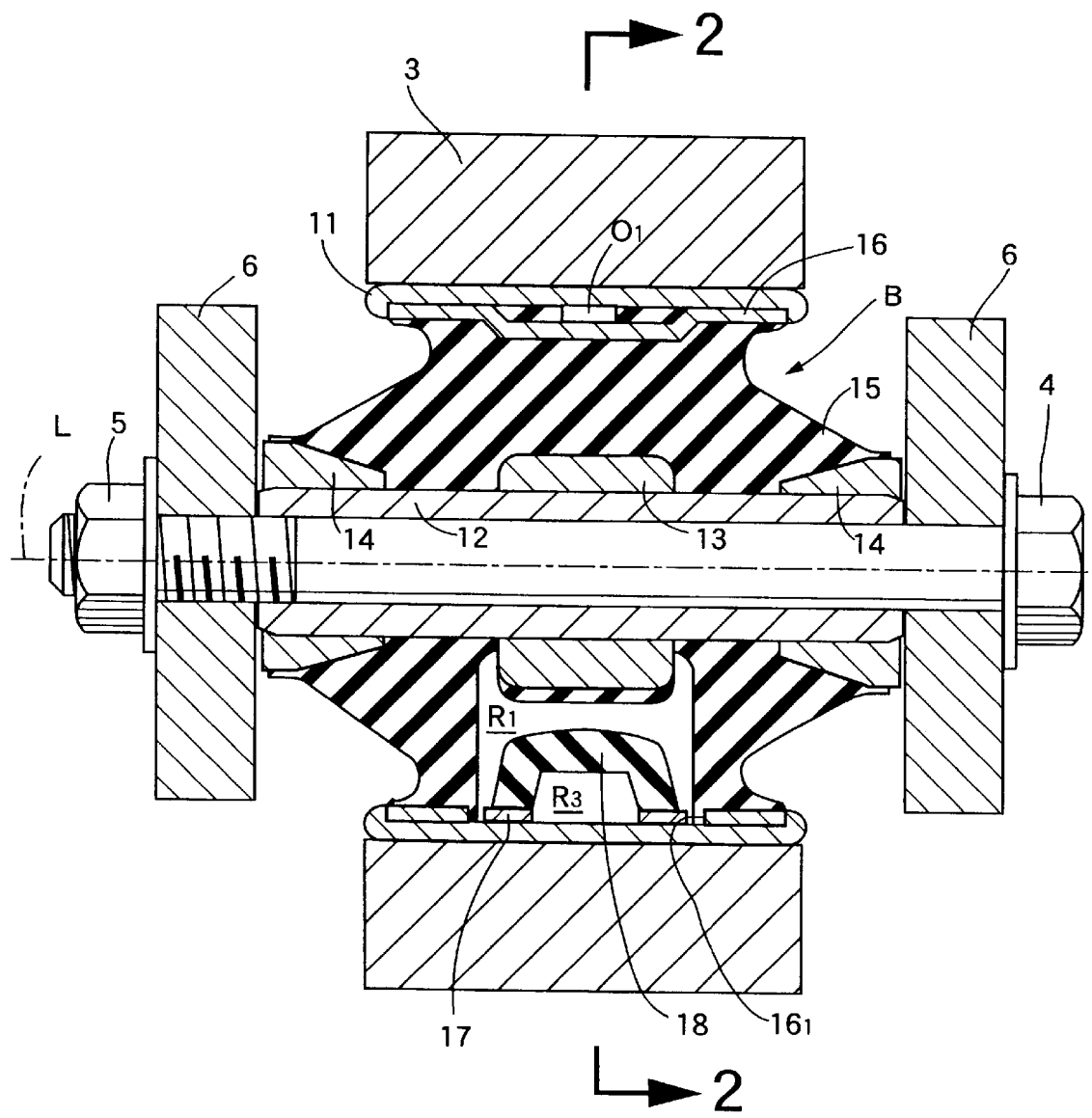
FIG. 3 is a sectional view taken along a line 3—3 in FIG. 2.

As shown in FIGS. 2 and 3, the liquid-encapsulated bushing B includes a larger-diameter outer sleeve 11 and a smaller-diameter inner sleeve 12 which is concentrically disposed within the outer sleeve 11 so that the inner sleeve has a common axis with the outer sleeve 11. A first elastomeric member 15 is fixed by baking to outer peripheries of three inner collars 13, 14 and 14 (see FIG. 3) which are fixed to an outer periphery of the inner sleeve 12 by press-fitting. A substantially annular outer collar 16, which is fixed by baking to an outer periphery of the first elastomeric member 15, is fitted to an inner periphery of the outer sleeve 11 and fixed by caulking. The outer collar 16 includes a pair of circumferentially extending openings $16_1$ (see FIG. 3). Second elastomeric members 18 are fixed by baking to inner peripheries of a pair of arcuate support plates 17 fitted in the openings $16_1$, respectively.

The first and second elastomeric members 15 and 18 are formed from different materials. The outer and inner sleeves 11 and 12 are concentrically positioned by partial abutment of an outer surface of the first elastomeric member 15 and an inner surface of the second elastomeric member 18.

Loads mainly in directions of arrows X and X' in FIG. 2 are input to the liquid-encapsulated bushing B from the suspension arm 1. First liquid chambers $R_1$ and second liquid chambers $R_2$ are defined between the first elastomeric member 15, the second elastomeric members 18 and the outer sleeve 11 and disposed on opposite sides of the axis L in the directions of the arrows X and X'. The first and second liquid chambers $R_1$ and $R_2$ communicate with each other through a pair of orifices $O_1$ defined between the outer sleeve 11 and the outer collar 16.

A third liquid chamber $R_3$ and a fourth liquid chamber $R_4$, as auxiliary liquid chambers, are defined between the pair of second elastomeric members 18 and the outer sleeve 11. The third and fourth liquid chambers $R_3$ and $R_4$ are disposed outside the first and second liquid chambers $R_1$ and $R_2$ in the directions of the arrows X and X'. The third liquid chamber $R_3$ communicates with opposite ends of the first liquid chamber $R_1$ through second orifices $O_2$ defined between the outer sleeve 11 and the arcuate support plates 17. The fourth liquid chamber $R_4$ communicates with opposite ends of the second liquid chamber $R_2$ through second orifices $O_2$ defined between the outer sleeve 11 and the arcuate support plates 17. Each of the second orifices $O_2$ has a flow path sectional area which is set smaller than a flow path sectional area of each of the first orifices $O_1$.

The operation of the embodiment of the present invention having the above-described construction will be described below.

Figure 4:
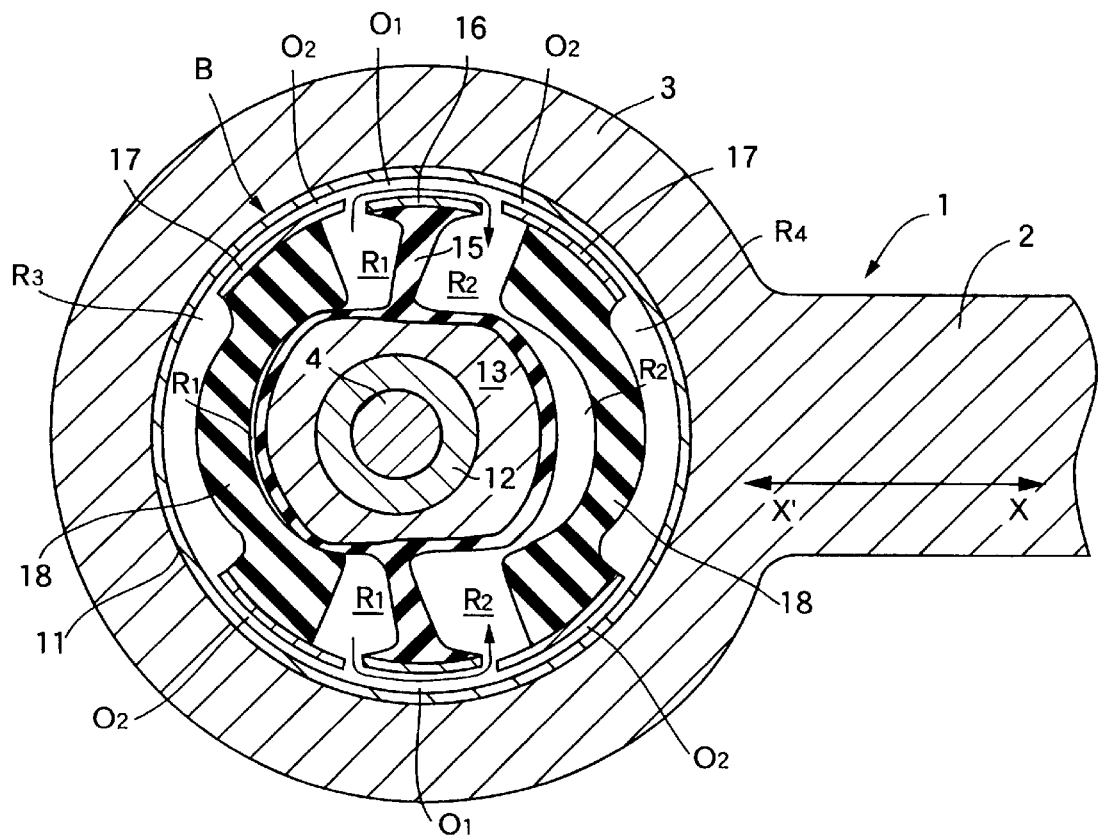
FIG. 4 is a view for explaining the operation when a small load is input.

Loads in the directions of the arrows X and X' in FIG. 2 are applied to the suspension arm 1 by a load which is transmitted from a road surface to a tire due to traveling of the vehicle. Suppose that a relatively small load in the direction of the arrow X is applied to the suspension arm 1. In this case, as shown in FIG. 4, the first elastomeric member 15 is deformed to decrease the volume of the first liquid chamber $R_1$ and to increase the volume of the second liquid chamber $R_2$, thereby causing liquid, forced out of the first liquid chamber $R_1$, to be displaced through the first orifices $O_1$ into the second liquid chamber $R_2$. Conversely, when a relatively small load in the direction of arrow X' is applied to the suspension arm 1, the volume of the second liquid chamber $R_2$ is decreased and the first liquid chamber $R_1$ is increased, thereby causing the liquid, forced out of the second liquid chamber $R_2$, to be displaced through the first orifices $O_1$ into the first liquid chamber $R_1$.

When the liquid passes through the first orifices $O_1$ as a result of the volume of either the first liquid chamber $R_1$ and the second liquid chamber $R_2$ decreasing, the load input to the liquid-encapsulated bushing B is buffered by a resistance due to the liquid. In addition, since the flow path sectional area of the first orifice $O_1$ is set relatively large, the resistance due to the liquid (i.e., a damping force) is relatively small. Thus, an appropriate damping force, corresponding to the magnitude of the input load, can be obtained.

Figure 5:
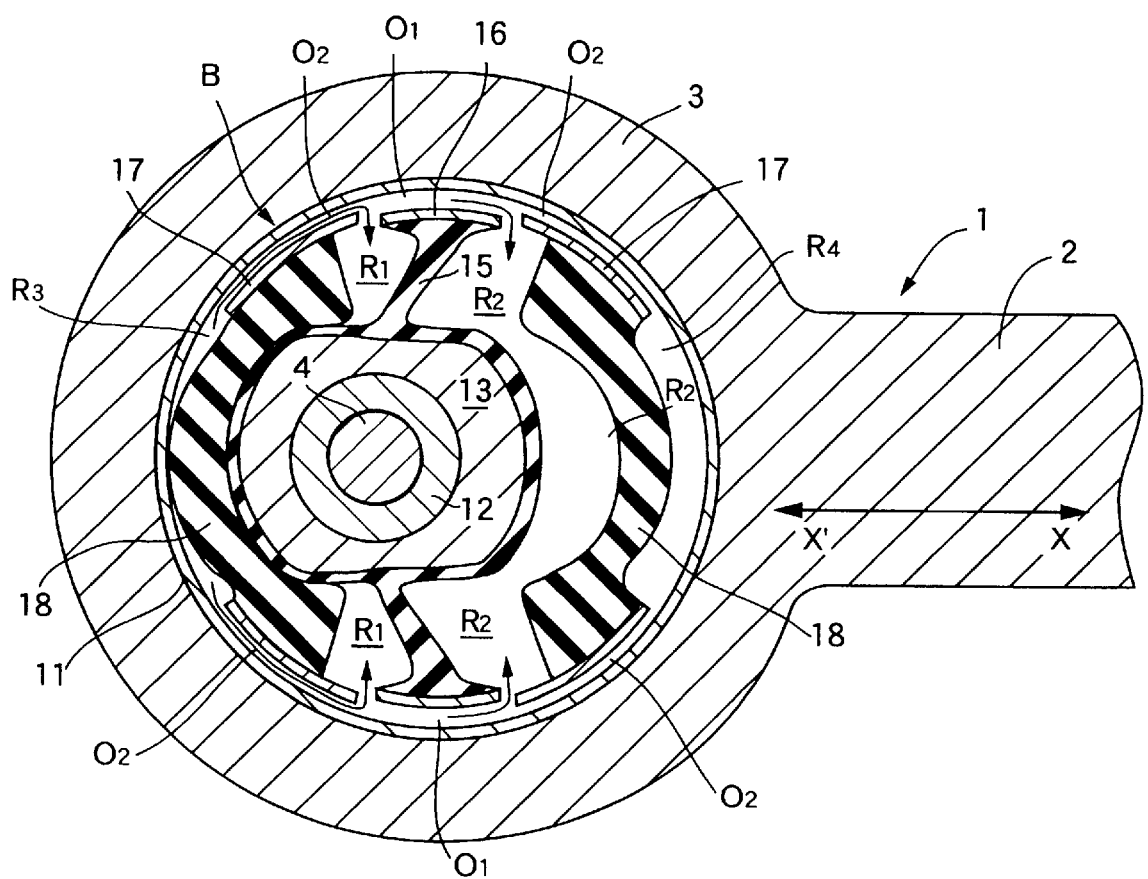
FIG. 5 is a view for explaining the operation when a large load is input.

When a large first load in the direction of the arrow X is applied to the suspension arm 1, the volume of a central portion of the first liquid chamber $R_1$ is eliminated, as shown in FIG. 5, thereby causing the outer surface of the first elastomeric member 15 and the inner surface of one of the second elastomeric members 18 to be brought into close contact with each other. As a result, the second elastomeric member 18 is pushed by the first elastomeric member 15 and is deformed which decreases the volume of the third liquid chamber $R_3$, thereby causing the liquid forced out of the third liquid chamber $R_3$ to flow through the second orifices $O_2$ into the second liquid chamber $R_2$. During this time, the liquid flowing through the second orifices $O_2$ can provide a large resistance to provide a damping force sufficient to oppose the input load, because each of the second orifices $O_2$ has a relatively small flow path sectional area.

When an additional load which is larger than the first load is input, the outer surface of the second elastomeric member 18 is put into abutment against the inner surface of the outer sleeve 11 to exhibit a stopper function for inhibiting the further increase in amount of relative movement of the outer and inner sleeves 11 and 12.

Conversely, when a large load in the direction of the arrow X' is applied to the suspension arm 1, the volume of a central portion of the second liquid chamber $R_2$ is eliminated, causing the outer surface of the first elastomeric member 15 and the inner surface of the other second elastomeric member 18 to be brought into close contact with each other. This causes the second elastomeric member 18 to be pushed by the first elastomeric member 15 and is deformed which decreases the volume of the fourth liquid chamber $R_4$, thereby causing the liquid forced out of the fourth liquid chamber $R_4$ to flow through the second orifices $O_2$ into the second liquid chamber $R_2$ and further through the first orifices $O_1$ into the first liquid chamber $R_1$. Even in this case, a damping force sufficient to oppose the large input load can be provided by the resistance due to the liquid passing through the orifices $O_2$ having the relatively small flow path sectional area.

Figure 6:
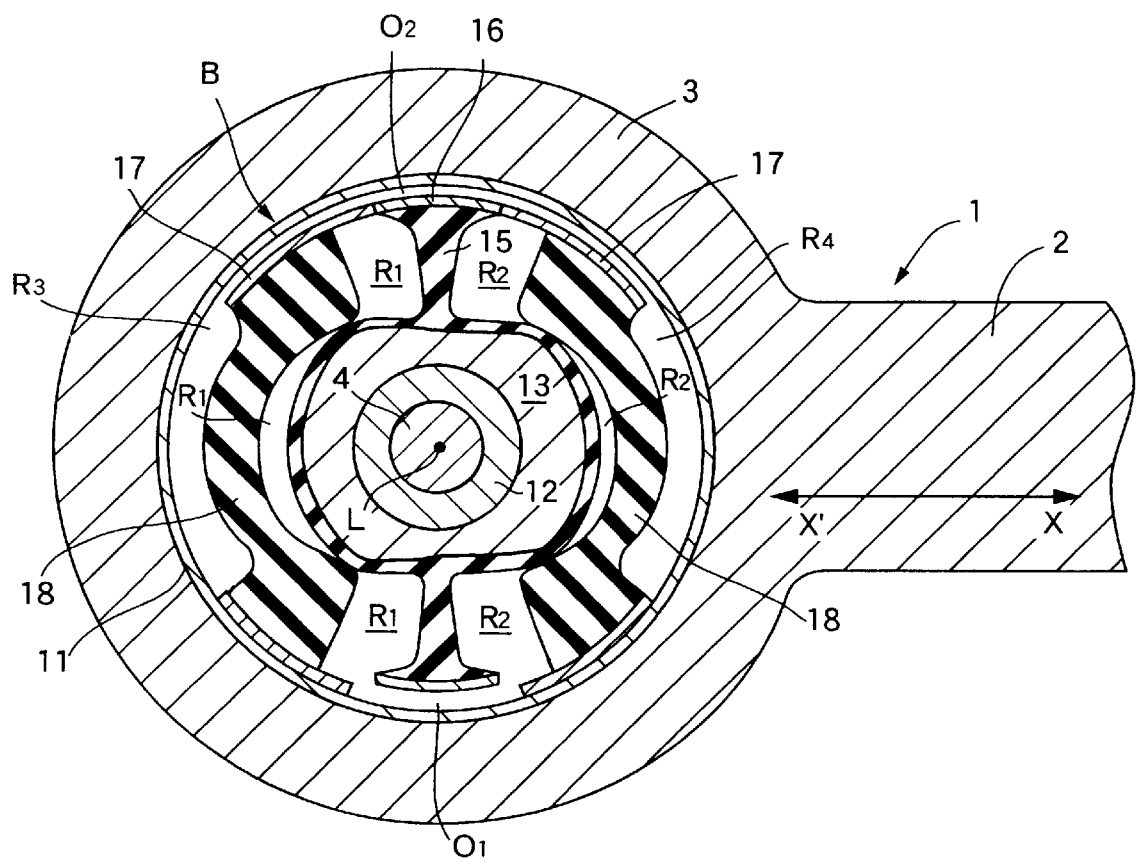
FIG. 6 is a view similar to FIG. 2, but according to a second embodiment of the present invention.
Figure 7:
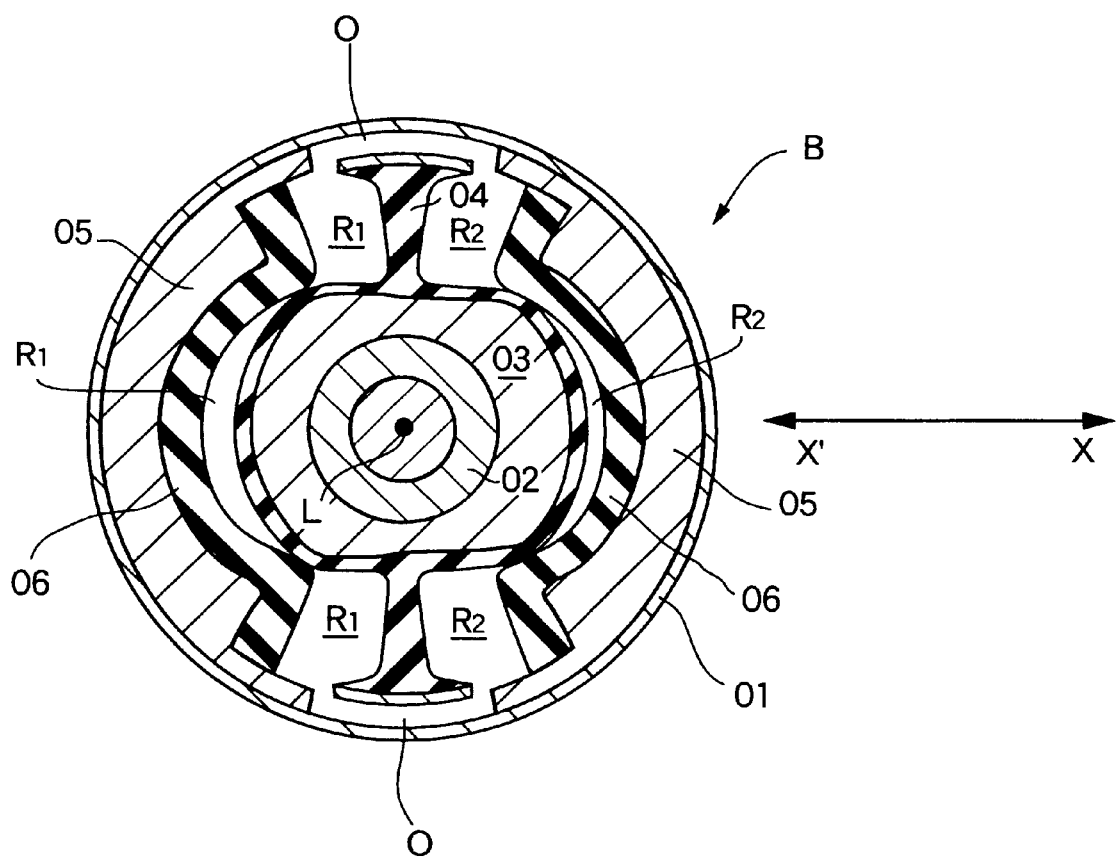
FIG. 7 is a sectional view of a conventional liquid-encapsulated bushing.

A second embodiment of the present invention will now be described with reference to FIG. 6.

A liquid-encapsulated bushing B according to the second embodiment includes first, second, third and fourth liquid chambers $R_1$, $R_2$, $R_3$ and $R_4$ and first and second orifices $O_1$ and $O_2$, as in the first embodiment. However, the first and second liquid chambers $R_1$ and $R_2$ communicate with each other through the single first orifice $O_1$, and the third and fourth liquid chambers $R_3$ and $R_4$ communicate with each other through the single second orifice $O_2$. The flow path sectional area of the second orifice $O_2$ is smaller than that of the first orifice $O_1$, as in the first embodiment. The volumes of the first and second liquid chambers $R_1$ and $R_2$ are increased and decreased even in a state in which the input load in the directions of the arrows X and X' is small, and the volumes of the third and fourth liquid chambers $R_3$ and $R_4$ are increased and decreased even in a state in which the input load in the directions of the arrows X and X' is large.

In the state in which the input first load in the directions of the arrows X and X' is small, the liquid is passed through the first orifice $O_1$ having the relatively large flow path sectional area as a result of the respective increasing and decreasing of the volumes of the first and second liquid chambers $R_1$ and $R_2$, and an appropriate damping force, corresponding to the input load, can be provided by the resistance due to the liquid when it passes through the first orifice $O_1$.

When an additional load which is larger than the first load is applied to the suspension arm 1, causing the second elastomeric members 18 to be pushed by the first elastomeric member 15 and to be deformed, the volumes of the third and fourth liquid chambers $R_3$ and $R_4$ are respectively increased and decreased. As a result, the liquid is passed through the second orifice $O_2$ having the relatively small flow path sectional area, and a sufficient damping force, corresponding to the input load, can be provided by the resistance due to the liquid when it passes through the second orifice $O_2$.

When a further larger load is input, the outer surface of the second elastomeric members 18 is placed into abutment against the outer sleeve 11 to exhibit a stopper function for inhibiting a further increase in the amount of relative movement of the outer and inner sleeves 11 and 12.

Although the first and second elastomeric members 15 and 18 have been described as formed from different materials in the embodiments, they may be formed from the same material. The first embodiment includes two auxiliary chambers (the third and fourth liquid chambers $R_3$ and $R_4$), but the number of the auxiliary liquid chambers may be at least one.

Furthermore, the application of the liquid-encapsulated bushing according to the present invention is not limited to being supported on a suspension arm 1 of a vehicle.

Although the embodiments of the present invention have been described in detail, it will be understood that the present invention is not limited to the above-described embodiments, and various modifications may be made without departing from the spirit and scope of the invention in the claims.

What is claimed is:

1. A liquid-encapsulated bushing comprising:

an outer sleeve;

an inner sleeve having an axis parallel to an axis of said outer sleeve;

first and second separate elastomeric members disposed between said outer and inner sleeves, said first elastomeric member being fixed to an outer periphery of said inner sleeve;

first and second liquid chambers defined on opposite sides of the inner sleeve to face said first and second elastomeric members and communicate with one another through orifice means, so that a radial first relative movement between said outer and inner sleeves is buffered by a resistance due to a liquid passed through the orifice means; and at least one auxiliary liquid chamber defined between said second elastomeric member and said outer sleeve and located radially outside at least one of said first and second liquid chambers to communicate with said first and second liquid chambers through further orifice means, said at least one auxiliary liquid chamber being defined so that a volume thereof is increased or decreased due to a second relative movement between said outer and inner sleeves which is larger than the first relative movement and is caused by said second elastomeric member being pushed by said inner sleeve.

2. A liquid-encapsulated bushing according to claim 1, wherein a flow path sectional area of said further orifice means is set smaller than a flow path sectional area of said orifice means.

3. A liquid-encapsulated bushing according to claim 1, wherein a pair of said second elastomeric members are provided and concentrically positioned around said first elastomeric member and in partial abutment therewith.

4. A liquid-encapsulated bushing comprising:

an outer sleeve;

an inner sleeve having an axis parallel to an axis of said outer sleeve;

first and second separate elastomeric members disposed between said outer and inner sleeves, said first elastomeric member being fixed to an outer periphery of said inner sleeve;

first and second liquid chambers defined on opposite sides of the inner sleeve to face said first and second elastomeric members and communicate with one another through orifice means, so that a radial first relative movement between said outer and inner sleeves is buffered by a resistance due to a liquid passed through the orifice means; and two single auxiliary liquid chambers defined between said second elastomeric member and said outer sleeve and located radially outside said first and second liquid chambers to communicate with each other through further orifice means, each said auxiliary liquid chamber being defined so that a volume thereof is increased or decreased due to a second relative movement between said outer and inner sleeves which is larger than the first relative movement and is caused by said second elastomeric member being pushed by said inner sleeve.

5. A liquid-encapsulated bushing according to claim 4, wherein a flow path sectional area of said further orifice means is set smaller than a flow path sectional area of said orifice means.

6. A liquid-encapsulated bushing according to claim 4, wherein a pair of said second elastomeric members are provided and concentrically positioned around said first elastomeric member and in partial abutment therewith.

7. A liquid-encapsulated bushing according to claim 4, wherein said orifice means and said further orifice means are located on opposite sides of said axis of said inner sleeve.

* * * * *